Sept. 3, 1929.  C. M. TEMPLETON  1,726,597
SEAT ADJUSTER
Filed Nov. 29, 1926
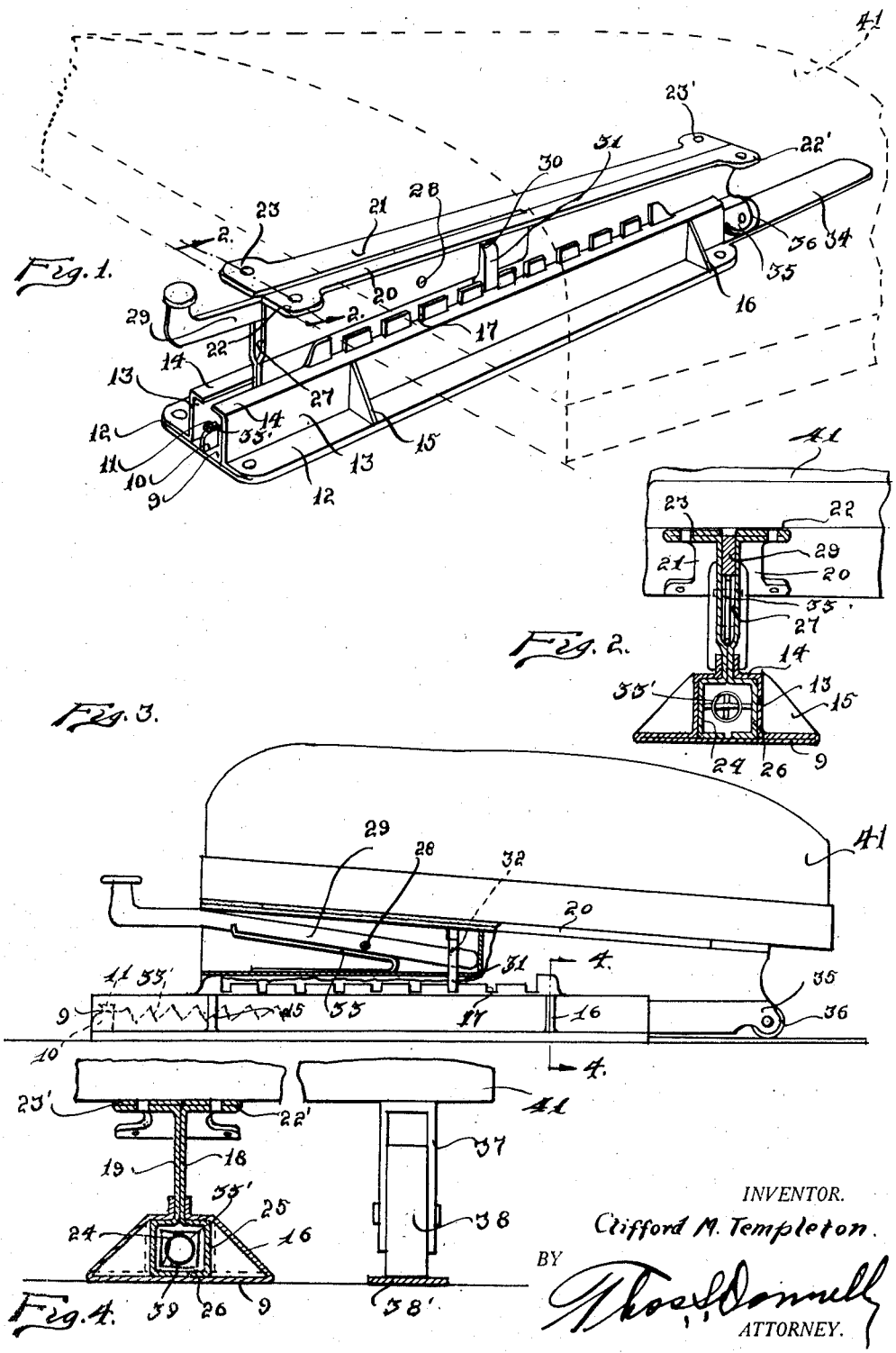
INVENTOR.
Clifford M. Templeton.
BY
ATTORNEY.

Patented Sept. 3, 1929.

1,726,597

UNITED STATES PATENT OFFICE.

CLIFFORD M. TEMPLETON, OF DETROIT, MICHIGAN.

SEAT ADJUSTER.

Application filed November 29, 1926. Serial No. 151,387.

My invention relates to a new and useful improvement in a seat adjuster adapted for use particularly with vehicles, such as automobiles and the like, in which an adjustable support is provided for the seat, whereby its position relatively to the body upon which mounted may be varied, so that the seat may be located in the position of greatest comfort for the drivers.

An object, therefore, of the invention is the provision of an adjusting mechanism of this class whereby the location of the seat relatively to the body may be varied at will.

Another object of the invention is the provision of a device of this class which will be simple in structure, economical of manufacture and highly efficient in use.

Another object of the invention is the provision of a mechanism of this class in which the movement of the seat forwardly of the vehicle body will be assisted and its reverse movement resisted.

Another object of the invention is the provision of a mechanism for locking the seat support in its various positions of adjustment.

Another object of the invention is the provision of easily accessible means for releasing the seat for movement relatively to the vehicle upon which mounted.

Other objects will appear hereinafter.

The invention consists in the combination and arrangement of parts hereinafter described and claimed.

The invention will be best understood by a reference to the accompanying drawings which form a part of this specification, and in which—

Fig. 1 is a perspective view of the invention showing in fragment a seat mounted thereon.

Fig. 2 is a sectional view of the invention taken on substantially line 2—2 of Fig. 1.

Fig. 3 is a side elevational view of the invention with a part broken away and a part shown in section.

Fig. 4 is a fragmentary sectional view taken on substantially line 4—4 of Fig. 3.

In the drawings I have illustrated the invention as constructed primarily from stampings, but from the description it will appear evident that the particular method of fabrication is not essential as castings may be resorted to, if desired.

The invention comprises a base 9, projecting upwardly from which at the forward end is a tongue 10 having a reduced portion 11, the purpose of which will appear hereinafter. A pair of guide members similarly constructed is mounted on the base 9, one at each end, and extending longitudinally thereof. These guide members comprise the horizontally disposed portion 12, the vertically extending portion 13, and the inwardly turned horizontally disposed flange forming portion 14. Reinforcing ribs 15 and 16 are formed on these guide members by buckling the material during the stamping process. Where a casting is used, of course the rib would be cast integral with the portion 12 and the portion 13. It will be noted that when mounted on the base 9 the inner edges of the flange forming portion 14 do not meet, thus leaving a space therebetween. Projecting through this space between the members 14 are vertically extending supports 18 and 19, having the angularly turned outwardly extending portions 20 and 21 respectively, these portions 20 and 21 being provided at opposite ends with the lugs 22 and 22', and 23 and 23' respectively. The lower end of the members 18 and 19 are formed U-shaped to provide the legs 24 and 26 and the bight 25, so as to lie in close engagement with the inner sides of the portions 13 and 14, and the inner surface of the base 9. As shown in Fig. 1, the upper forward portions of the members 18 and 19 are outwardly offset to provide the space 27. Engaging in the space 27 is a lever 29 which is pivoted, intermediate its ends, on the pin 28, which extends through the members 18 and 19. The members 14, intermediate their ends, are again angularly turned to extend upwardly and provided with tapered notches 17, these notches being adapted for the reception of the tapered locking finger 31 which is provided with the opening 32 through which the inner end of the lever 29 is projected, the locking finger 31 engaging in a slot 30 formed in the members 18 and 19. A spring 33 engages the under surface of the lever 29 and its doubled over end engages the bottom of the space 27, serving normally to retain the lever 29 in its upwardly rocked position, as shown in Fig. 2, so as to retain the locking finger 31 in engagement with the notches 17. Secured at one end to the reduced portion 11 of the tongue 10 and at its other end to the members 18 and 19 is a spring 33' which normally tends to, upon disengagement of the locking finger 31 from the recesses 17, move the members 18 and 19 forwardly of the base 9, a rearward movement of these members relatively to the base being against the tension of the spring 33'.

Extending rearwardly from the center of the base 9 is a wear plate 34 which is adapted to engage the roller 36 mounted between the rearwardly extending lugs 35 on the members 18 and 19.

In operation the lugs 22 and 22' and 23 and 23' are secured to the under surface of the seat frame. Where a single seat is used this device would be ordinarily secured centrally of the seat. Where a double seat is used a pair of devices may be mounted at opposite sides and a pair of levers 29 connected by a suitable cross bar. When the device is mounted on a single seat it is desirable that the rear corners of the seat be supported, and to this end I have provided a yoke 37 which is adapted for mounting on the under surface of the seat 41, adjacent the rear corners. Supported by the yoke 37 is the roller 38, the yoke and roller forming a castor for the seat, the roller 38 riding on a wear plate 38' which is mounted on the floor of the car body. Formed in the upper surface of the legs 24 is a recess 40 in which is positioned a bow shaped leaf spring 39, this spring serving as an anti-rattler to prevent rattling of the various parts. The base, with its co-operating parts is, of course, attached to the floor of the vehicle body by any suitable means.

In operation, when the driver of the vehicle desires to move the seat rearwardly the lever 29 will be pressed downwardly, thus disengaging the locking finger 31 from the recess 17, after which the operator may move the seat rearwardly with ease, the rollers serving to facilitate this movement. When the desired position has been reached the locking finger 31 may be released to engage in the nearest recess 17. When it is desired to move the seat forwardly of the body, the lever 29 will be rocked downwardly and the seat moved forwardly by the operator, the spring 33 serving to facilitate this movement.

It is believed evident that a structure such as shown is one which may be easily and quickly operated to afford the desired adjustment, so as to produce the comfort required, while at the same time, it is of cheap manufacture and durable structure.

While I have illustrated and described the preferred form of construction, I do not wish to limit myself to the precise form of structure shown but desire to avail myself of such variations and modifications as may come within the scope of the appended claims.

Having thus described my invention what I claim as new and desire to secure by Letters Patent is:

1. A seat adjuster of the class described comprising: a base; a wear plate projecting rearwardly of said base; a plurality of guide members projecting upwardly and thence inwardly toward each other, the inwardly projecting portion being spaced apart; a carriage comprising a pair of parallel extending inwardly projecting members having the upper ends thereof turned outwardly from each other, the upper forward portion of said members being spaced apart; a locking finger riding in a recess formed in said upwardy projecting members; a lever mounted in the space between said members and pivotally mounted intermediate its ends and attached adjacent one end to said locking finger, said locking finger being adapted for engaging in recesses formed in the upper edge of said guide members, the rocking of said lever in one direction effecting a movement of said locking finger out of engagement with said recesses.

2. A seat adjuster of the class described comprising: a base; a wear plate projecting rearwardly of said base; a plurality of guide members projecting upwardly and thence inwardly toward each other, the inwardly projecting portions being spaced apart; a carriage comprising a pair of parallel extending inwardly projecting members having the upper ends thereof turned outwardly from each other, the upper forward portion of said members being spaced apart; a locking finger riding in a recess formed in said upwardly projecting members; a lever mounted in the space between said members and pivotally mounted intermediate its ends and attached adjacent one end to said locking finger, said locking finger being adapted for engaging in recesses formed in the upper edge of said guide members, the rocking of said lever in one direction effecting a movement of said locking finger out of engagement with said recesses; and resilient means for normally resisting movement of said carriage in one direction relatively to said base.

3. A seat adjuster of the class described comprising: a base; a wear plate projecting rearwardly of said base; a plurality of guide members projecting upwardly and thence inwardly toward each other, the inwardly projecting portions being spaced apart; a carriage comprising a pair of parallel extending inwardly projecting members having the upper ends thereof turned outwardly from each other, the upper forward portion of said members being spaced apart; a locking finger riding in a recess formed in said upwardly projecting members; a lever mounted in the space between said members and pivotally mounted intermediate its ends and attached adjacent one end to said locking finger, said locking finger being adapted for engaging in recesses formed in the upper edge of said guide members, the rocking of said lever in one direction effecting a movement of said locking finger out of engagement with said recesses; and resilient means for normally resisting movement of said carriage in one direction relatively to said base; and a roller carried by said carriage engaging said wear plate.

4. A seat adjuster of the class described, comprising: spaced pairs of upwardly directed guide members the guide members in each pair being in spaced relation to each other and having their upper ends turned inwardly toward each other; teeth formed on the upper edge of said guide members; a carriage slidably mounted between each pair of said guide members and projecting upwardly from between the same; a portion of said carriage engaging the inwardly turned portions of said guide members and preventing withdrawal of said carriage vertically from between said guide members; a lever rockingly mounted on said carriage; and a locking finger movable by said lever for engaging between said teeth and locking said carriage against longitudinal movement relatively to said guide members.

In testimony whereof I have signed the foregoing.

CLIFFORD M. TEMPLETON.